United States Patent
Wiss et al.

(10) Patent No.: US 7,643,535 B1
(45) Date of Patent: Jan. 5, 2010

(54) COMPATIBLE PREPARATION AND DETECTION OF PREAMBLES OF DIRECT SEQUENCE SPREAD SPECTRUM (DSSS) AND NARROW BAND SIGNALS

(75) Inventors: John Robert Wiss, Carlsbad, CA (US); Yuhui Marie Ren, San Diego, CA (US)

(73) Assignee: L-3 Communications Titan Corporation, San Diego, CA (US)

( * ) Notice: Subject to any disclaimer, the term of this patent is extended or adjusted under 35 U.S.C. 154(b) by 622 days.

(21) Appl. No.: 11/460,337

(22) Filed: Jul. 27, 2006

(51) Int. Cl.
*H04B 1/00* (2006.01)
(52) U.S. Cl. .................................................... 375/140
(58) Field of Classification Search ................ 375/140, 375/142, 146–147, 150, 343; 370/349–350, 370/503
See application file for complete search history.

(56) References Cited

U.S. PATENT DOCUMENTS 5,022,046 A * 6/1991 Morrow, Jr. ................ 375/130
7,184,426 B2 * 2/2007 Padovani et al. ............ 370/347
7,343,282 B2 * 3/2008 Kirla et al. .................. 704/212

* cited by examiner

*Primary Examiner*—Khanh C Tran
(74) *Attorney, Agent, or Firm*—Edward W. Callan (57) ABSTRACT

The preambles of narrow band signals and DSSS signals are prepared for compatible detection. The preamble is encoded by encoding a sequence of identical preamble blocks with sequentially corresponding code elements of a preamble encoding sequence. Each of the identical preamble blocks has the same predetermined pattern of code elements. When the signal is a DSSS signal, the preamble is a spread preamble in which each of the blocks has a number of code elements corresponding to a spread-factor multiple of the number of code elements in a block of an unspread preamble for a narrow band signal. The preambles of both types of received signals are detected by processing a metric representing detected coherent energy with a metric representing detected noncoherent energy, after first determining that the detected noncoherent energy is greater than the average energy of the received signal.

20 Claims, 8 Drawing Sheets

FIG. 11   DETECTOR METRICS FOR LOW SNR

FIG. 12   DETECTOR METRICS FOR HIGH SNR

FIG. 13

COMPATIBLE PREPARATION AND DETECTION OF PREAMBLES OF DIRECT SEQUENCE SPREAD SPECTRUM (DSSS) AND NARROW BAND SIGNALS

BACKGROUND AND SUMMARY OF THE INVENTION

The present invention generally pertains to communication signal processing and is particularly directed to the preparation and detection of preambles in direct sequence spread spectrum (DSSS) and narrow band signals.

The present invention provides a method of processing preambles of signals that are to be transmitted as direct sequence spread spectrum (DSSS) signals and narrowband signals to prepare the preambles for transmission, comprising the steps of:

(a) when the signal is to be transmitted as a narrow band signal, providing an unspread preamble that includes a sequence of blocks, with each of the blocks having the same number of code elements in the same predetermined pattern;

(b) when the signal is to be transmitted as a DSSS signal, providing a spread preamble that includes a sequence of the same number of blocks as the number of blocks in the unspread preamble, with each of the blocks of the spread preamble having a number of code elements corresponding to a spread-factor multiple of the number of code elements in each of the blocks of the unspread preamble, with each of the blocks of the spread preamble having the same predetermined pattern of code elements; wherein the spread factor is an integer greater than one;

(c) providing a preamble encoding sequence that includes the same given number of code elements as the number of blocks of the preamble; and (d) using encoding means to encode the sequence of preamble blocks with sequentially corresponding code elements of the preamble encoding sequence to thereby provide a sequence of encoded preamble blocks.

The present invention also provides a method of detecting a preamble in a received signal, wherein the received signal includes a sequence of encoded preamble blocks, each of which blocks has the same number of code elements, wherein the sequence of encoded preamble blocks has been provided by encoding a sequence of identical preamble blocks with sequentially corresponding code elements of a preamble encoding sequence, and wherein each of the identical preamble blocks has the same predetermined pattern of code elements, the method comprising the steps of:

(a) using sampling means to periodically sample a received signal having said sequence of encoded preamble blocks to provide of a sequence of received signal samples;

(b) processing the received signal samples to provide a first metric representing an average energy of the received signal;

(c) processing the received signal samples with the predetermined pattern of code elements of the identical preamble blocks that were encoded to provide the sequence of encoded preamble blocks, to thereby provide samples of the received signal that are correlated with the predetermined pattern of code elements;

(d) processing the correlated samples to provide a second metric representing a noncoherent accumulation of energy over a first accumulation interval having a duration corresponding to the duration of a plurality of encoded preamble blocks;

(e) processing the correlated samples with the preamble encoding sequence, to thereby provide a third metric representing a coherent accumulation of energy over a second accumulation interval approximating the duration of the sequence of encoded preamble blocks; and (f) processing the second metric with the first metric and the third metric to detect a preamble in the received signal.

This method can be used for detecting the predetermined preamble in both signals that are transmitted as narrow band signals and signals that are transmitted as DSSS signals, provided that the preambles for both types of signals are prepared for transmission in accordance with the method of the present invention.

The present invention thereby provides compatible preparation and detection of a preamble in narrow band and DSSS signals.

The present invention additionally provides a system for performing the above-described preamble detection method and computer readable storage media containing instructions for accomplishing various steps of such method.

Additional features of the present invention are described with reference to the detailed description of the preferred embodiments.

DETAILED DESCRIPTION

Figure 1:
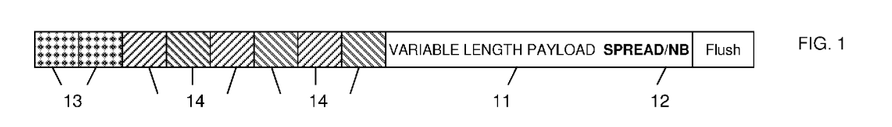
FIG. 1 is a diagram showing the general burst structure of a signal packet containing a preamble processed by the method of the present invention.

Referring to FIG. 1, the burst structure of a packet of the signal that is to be transmitted includes a preamble 10, a variable length payload 11 and a flush code 12. The preamble 10 includes a plurality of sacrificial segments 13 and a sequence of encoded preamble blocks 14. Although six encoded preamble blocks 14 are shown in FIG. 1, the preamble may include other than six encoded preamble blocks. In one preferred embodiment, the preamble includes twenty-eight encoded preamble blocks.

Figures 2, 3A:
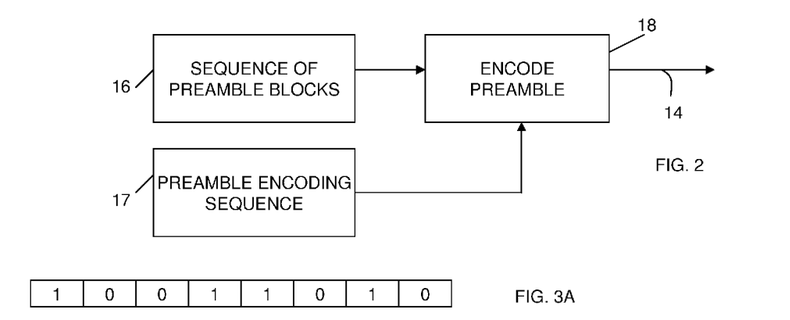
FIG. 2 is a block diagram of a method of processing preambles to prepare the preambles for transmission in accordance with the method of the present invention.
FIG. 3A shows an exemplary predetermined pattern of code elements in an unspread preamble block for a narrow band signal.

Referring to FIG. 2, a method of processing preambles of signals that are to be transmitted as direct sequence spread spectrum (DSSS) signals and narrowband signals to prepare the preambles for transmission includes the steps of: 16 providing a sequence of preamble blocks, 17 providing a preamble encoding sequence that includes the same given number of code elements as the number of blocks of the preamble, and 18 encoding the sequence of preamble blocks with sequentially corresponding code elements of the preamble encoding sequence to thereby provide a sequence of encoded preamble blocks 14.

When the signal is to be transmitted as a narrow band signal, an unspread preamble is provided in step 16. An exemplary predetermined pattern of code elements in an unspread preamble block for a narrow band signal is shown in FIG. 3A.

Each of the unspread preamble blocks of the sequence provided in step 16 has the same predetermined pattern of code elements. In the preferred embodiment, the pattern is a binary pattern, whereby the code elements are binary code elements, such as a one and a zero, or a plus and a minus, or some other pair of binary code elements. In alternative embodiments, a different pattern, such as a trinary or quadnary pattern, may be used.

Figure 3B:
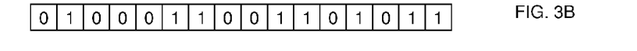
FIG. 3B shows an exemplary predetermined pattern of code elements in a spread preamble block for a DSSS signal, wherein the spread factor is two.

When the signal is to be transmitted as a DSSS signal, a spread preamble is provided in step 16. An exemplary predetermined pattern of code elements in a spread preamble block for a DSSS signal, wherein the spread factor is two, is shown in FIG. 3B. The spread preamble for the DSSS signal includes a sequence of the same number of blocks as the number of blocks in the unspread preamble for the narrow band signal. Each of the blocks of the spread preamble has a number of code elements corresponding to a spread-factor multiple of the number of code elements in each of the blocks of the unspread preamble, whereby when each preamble block of the unspread preamble includes eight code elements, as shown in FIG. 3A, and the spread factor is two, each preamble block of the spread preamble includes sixteen code elements, as shown in FIG. 3B.

The preamble encoding sequence includes the same given number of code elements as the number of blocks 14 in the preamble 10. Only three code elements of an exemplary preamble encoding sequence are shown in FIG. 3C.

Figure 3C:
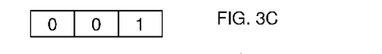
FIG. 3C shows the three code elements of an exemplary preamble encoding sequence.
Figures 3D, 3E:
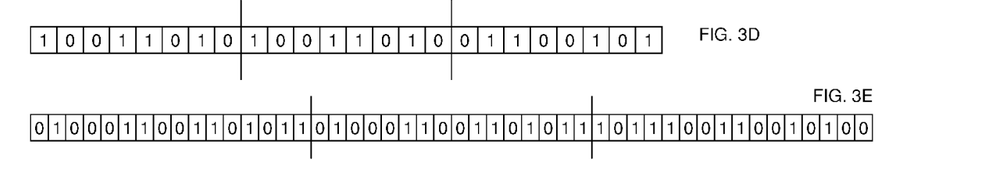
FIG. 3D shows a sequence of three encoded preamble blocks of a narrow band signal provided by encoding a sequence of three unspread preamble blocks having the predetermined pattern of code elements shown in FIG. 3A with three sequentially corresponding code elements of the preamble encoding sequence shown in FIG. 3C.
FIG. 3E shows a sequence of three encoded preamble blocks of a DSSS signal provided by encoding a sequence of three spread preamble blocks having the predetermined pattern of code elements shown in FIG. 3B with three sequentially corresponding code elements of the preamble encoding sequence shown in FIG. 3C.

When the signal to be transmitted is a narrow band signal and a sequence of three identical unspread preamble blocks having the predetermined pattern of code elements shown in FIG. 3A is encoded with three sequentially corresponding code elements of the preamble encoding sequence shown in FIG. 3C, each of the code elements of the sequentially first block is encoded by exclusive-ORing with the sequentially first code element of the preamble encoding sequence, each of the code elements of the sequentially second block is encoded by exclusive-ORing with the sequentially second code element of the preamble encoding sequence, and each of the code elements of the sequentially third block is encoded by exclusive-ORing with the sequentially third code element of the preamble encoding sequence, to thereby provide the sequence of three encoded preamble blocks shown in FIG. 3D.

When the signal to be transmitted is a DSSS signal and a sequence of three identical spread preamble blocks having the predetermined pattern of code elements shown in FIG. 3B is encoded with three sequentially corresponding code elements of the preamble encoding sequence shown in FIG. 3C, each of the code elements of the sequentially first block is encoded by exclusive-ORing with the sequentially first code element of the preamble encoding sequence, each of the code elements of the sequentially second block is encoded by exclusive-ORing with the sequentially second code element of the preamble encoding sequence, and each of the code elements of the sequentially third block is encoded by exclusive-ORing with the sequentially third code element of the preamble encoding sequence, to thereby provide the sequence of three encoded preamble blocks shown in FIG. 3E.

The sacrificial segments 13 are inserted in the preamble 10 prior to the sequence of encoded preamble blocks 14. Each of sacrificial segments includes the same number of code elements as in each of the encoded preamble blocks, with the code elements of the sacrificial segments 13 having a pattern that is uncorrelated to the predetermined pattern of code elements in the individual preamble block that is provided in step 16 and encoded in step 18.

The sacrificial segments 13 having an uncorrelated pattern of code segments are included in the preamble 10 prior to the encoded preamble blocks 14 because while the AGC (automatic gain control) loop for the received signal is settling the received signal is subject to potentially wide gain variations that could impair proper detection of the preamble in the received signal as a result of the maximum energy peaks that are detected prior to settling of the AGC swamping the maximum energy peaks that are detected when the AGC finally settles.

Figure 4:
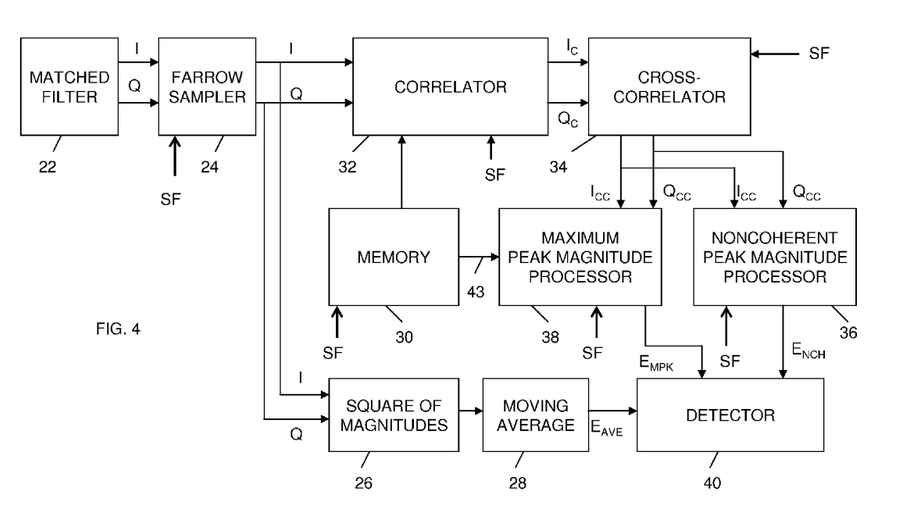
FIG. 4 is a block diagram of a system for detecting preambles in received signals in accordance with the present invention.

Referring to FIG. 4, a system for detecting preambles in received signals in accordance with the present invention includes a matched filter 22, a Farrow sampler 24, a unit 26 that determines the square of the magnitude of a signal input thereto, a unit 28 that determines a moving average of the magnitude of a signal input thereto over progressive evaluation intervals of a selected duration, a memory 30, a correlator 32, a cross-correlator 34, a noncoherent peak magnitude processor 36, a maximum peak magnitude processor 38 and a detector 40.

The matched filter 22 provides filtered I (in-phase) components and Q (quadrature-phase) components of a received BPSK/OQPSK signal in a frequency band that is selected in accordance with the frequency range of the received DSSS or narrow band signal. The filtered I and Q components are provided from the matched filter 22 to the sampler 24.

The Farrow sampler 24 periodically samples the I and Q components of a received signal having an encoded preamble that has been processed by the method described above with reference to FIGS. 2 and 3A through 3E. The sampler 24 samples the received I and Q components at a sampling rate that is an integer-multiple "n" of the code element symbol rate "sps" times the spread factor "SF" that was applied to prepare the signal for transmission, to thereby provide of a sequence of received signal samples.

$$\text{Sampling rate} = n \cdot sps \cdot SF \quad \{\text{Eq. 1}\}$$

When the signal is a narrow band signal, the applicable spread factor is one. In the preferred embodiment the sampling rate is twice the code-element symbol rate times the spread factor.

The I and Q component samples of the received signal are provided from the correlator 24 to the square-of-magnitude unit 26 and the memory 30.

The square-of-magnitude unit 26 processes the I and Q component samples of the received signal to determine the square of the magnitude of the samples of the received signal in accordance with the following equation:

$$M = (I + jQ)^2 \quad \{\text{Eq. 2}\}$$

The moving average generator 28 processes the square-of-magnitude determinations to generate a moving average thereof over progressive evaluation intervals, to thereby provide a first metric $E_{AVE}$ representing an average energy of the received signal over a plurality of progressive evaluation intervals. The duration of an evaluation interval is an integer-multiple of the duration of an individual block of the encoded preamble of the received signal, such as 64 samples when there are eight code-element symbols per block, two samples per symbol, a spread factor of one, and an integer multiple of four. The energy that is averaged by the moving average generator 28 represents the energy in the output of the matched filter 22, which may include thermal receiver noise, interference and adjacent channel energy in addition to the energy of the desired received signal.

The memory 30 stores a plurality of different predetermined patterns of code elements 42 for a plurality of different preamble blocks, such as shown in FIG. 3A for narrow band signals and as shown in FIG. 3B for DSSS signals. The memory 30 also stores a plurality of different sequences of code elements 43 corresponding to the different preamble encoding sequences, such as shown in FIG. 3C, that are used to encode the preamble blocks of different transmitted signals.

The predetermined pattern of code elements 42 of the preamble blocks that were encoded to provide the sequence of encoded preamble blocks in the signal that is being received is retrieved from the memory 30 and temporarily retained in a register (not shown) in the correlator 32. The correlator 32 processes the I and Q component samples of the received signal with the retrieved predetermined pattern of code elements 42 to thereby provide I and Q component samples of the received signal that are correlated with the predetermined pattern of code elements 42.

Figure 5:
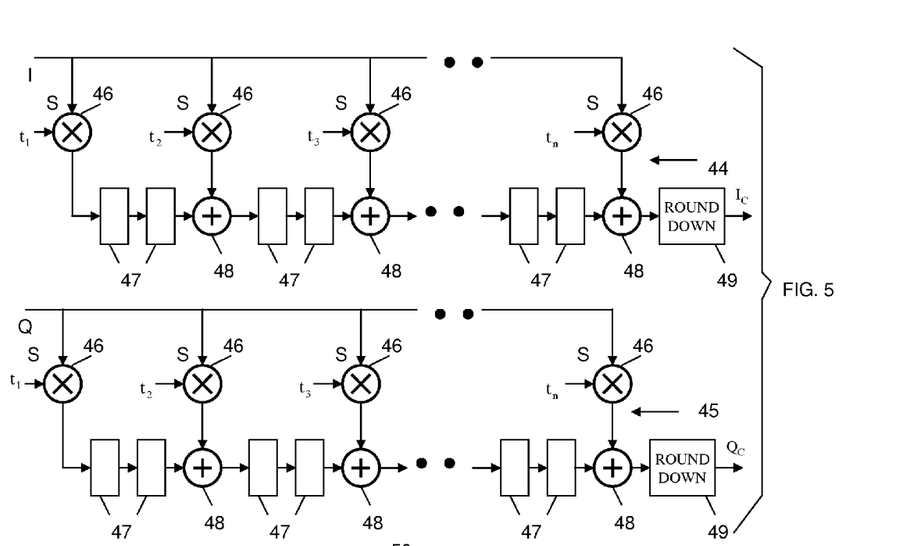
FIG. 5 is a diagram of the correlator in the system of FIG. 4.

Referring to FIG. 5, the correlator 32 includes an I-component correlation branch 44 and a Q-component correlation branch 45. Each correlation branch 44, 45 includes a plurality of simplified multiplication elements 46, a plurality of one-sample delay buffers 47 arrayed in a FIFO sequence, a plurality of addition units 48 located in the FIFO sequence after every two delay buffers 47, and a rounding-down unit 49. The addition units 48 are located after every two delay buffers 47 in accordance with two samples being provided for each symbol. A simplified multiplication unit 46 is simplified in that it is capable of multiplying by only either +1 or –1.

Figure 5A:
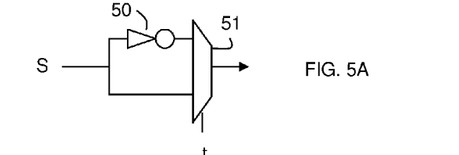
FIG. 5A is a diagram of a simplified multiplication element included in the correlator of FIG. 5.

Referring to FIG. 5A each simplified multiplication element 46 includes an inverter 50 and a multiplexer 51 which are connected as shown in the drawing. When the binary state of the control input "t" provided to the multiplexer 51 of the simplified multiplication element 46 is "one", the simplified multiplication element 46 inverts the sign of the sample provided to the signal input "s"; and when the binary state of the control input "t" is "zero", the simplified multiplication element 46 does not invert the sign of the sample provided to the signal input "s".

The control inputs "t" of the simplified multiplication elements 46 are coupled respectively to different taps of the correlator register in which the retrieved predetermined pattern of code elements 42 is retained temporarily for processing with the samples of the received signal.

The number of register taps and the corresponding number of simplified multiplication elements 46 of the correlator 32 that are utilized for processing the I and Q component samples of the received signal is selected in accordance with the spread factor SF.

The $I_C$ and $Q_C$ outputs of the correlator 32 are rounded down by a selected number of bits by the respective rounding-down units 49.

Referring again to FIG. 4, the correlator 32 provides the correlated samples of the received signal to the cross-correlator 34.

The cross-correlator 34 processes the correlated samples of the received signal in order to compensate for any frequency error in the correlated samples with respect to the received signal.

Figure 6:
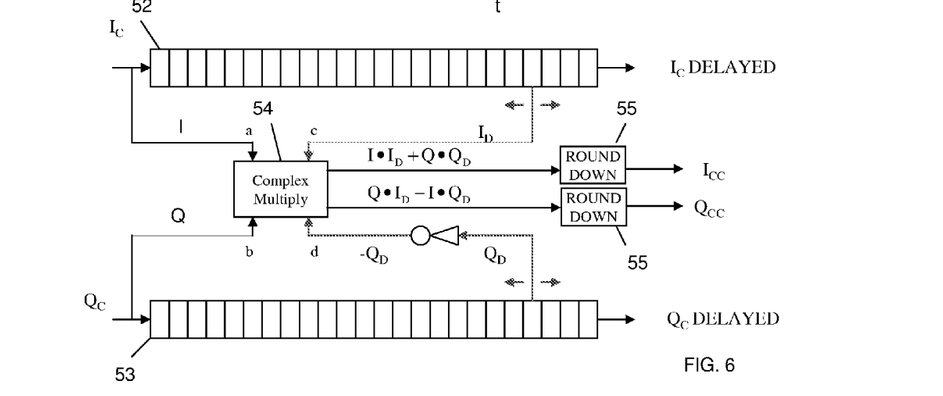
FIG. 6 is a diagram of the cross-correlator in the system of FIG. 4.

Referring to FIG. 6, the cross-correlator 34 includes an I-branch delay buffer 52, a Q-branch delay buffer 53, a complex multiplier 54 and a pair of rounding-down units 55 and an inverter 56. The delay buffers 52, 53 are implemented as circular or FIFO buffers or as RAMs that emulate a FIFO with variable depth.

The I-component samples of the correlated preamble are provided to the "a" input of the complex multiplier 54 and the Q-component samples of the correlated preamble are provided to the "b" input of the complex multiplier 54. Delayed I-component samples of the correlated preamble are provided to the "c" input of the complex multiplier 54 from a stage of the I-branch delay buffer 52 that provides a sample that has been delayed by a the number buffer stages that is a multiple of the number of samples-per-symbol "sps", the number of code elements "e" per preamble block and the spread factor SF.

$$\text{Delay} = sps \cdot e \cdot SF \quad \{\text{Eq. 3}\}$$

Delayed Q-component samples of the correlated preamble are inverted by the inverter 56 and provided to the "d" input of the complex multiplier 54 from a stage of the Q-branch delay buffer 52 that provides the same delay as provided by the corresponding buffer stage of the I-branch delay buffer from which the delayed I-component samples are provided.

Figure 7:
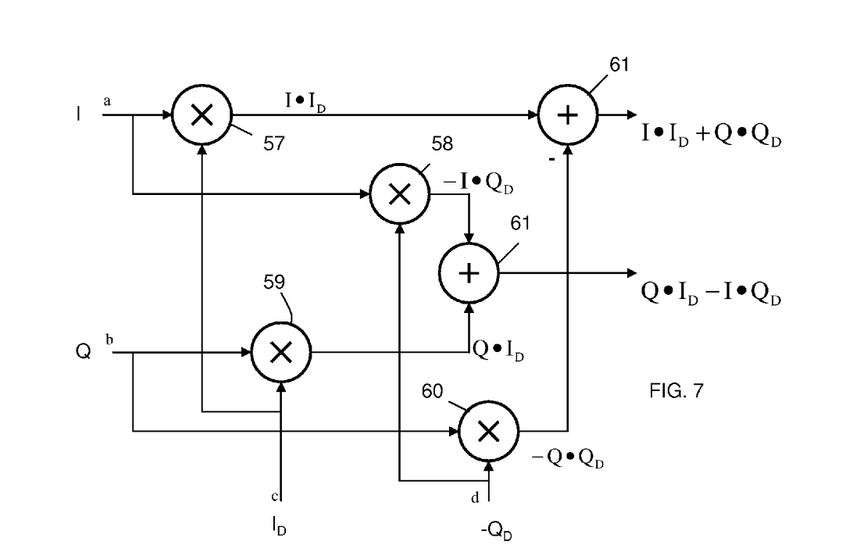
FIG. 7 is a diagram of the complex multiplier in the cross-correlator of FIG. 6.

Referring to FIG. 7, the complex multiplier 54 includes four multiplication units 57, 58, 59, 60 and two summation units 61, 62, which are connected to one another as shown in the drawing. The complex multiplier 54 cross-correlates the delayed and undelayed in-phase and quadrature-phase components, $I_D$, I, $Q_D$, Q of the correlated preamble to provide cross-correlated I-component samples $I_C$ and cross-correlated Q-component samples $Q_C$, wherein $$I_C = (I \cdot I_D) + (Q \cdot Q_D), \text{ and} \quad \{\text{Eq. 4}\}$$

$$Q_C = (Q \cdot I_D) - (I \cdot Q_D). \quad \{\text{Eq. 5}\}$$

The $I_C$ and $Q_C$ outputs of the complex multiplier 54 are rounded down by a selected number of bits by the respective rounding-down units 55.

Referring again to FIG. 4, the processing performed by the cross-correlator 34 compensates for any frequency error in the correlated samples of the correlated preamble with respect to the received signal by generating correlation peaks that have a relative phase offset that is proportional to the phase shift between adjacent coherent correlation peaks (i.e. the ratio of the frequency offset of the received signal relative to the symbol rate of the received signal) which occur when the spread encoded preamble of the received signal is aligned with the spread preamble encoding sequence that is being retained in the register of the correlator 32.

The rounded-down $I_{CC}$ and $Q_{CC}$ outputs from the cross-correlator 34 are provided as I-component and Q-component samples to the noncoherent peak magnitude processor 36 and the maximum peak magnitude processor 38.

The noncoherent peak magnitude processor 36 processes the cross-correlated samples $I_{CC}$ and $Q_{CC}$ from the cross-correlator 34 to provide a second metric $E_{NCH}$ representing a noncoherent accumulation of energy over a first accumulation interval approximating the duration of a plurality of encoded preamble blocks, such as the duration of twelve encoded preamble blocks.

Figure 8:
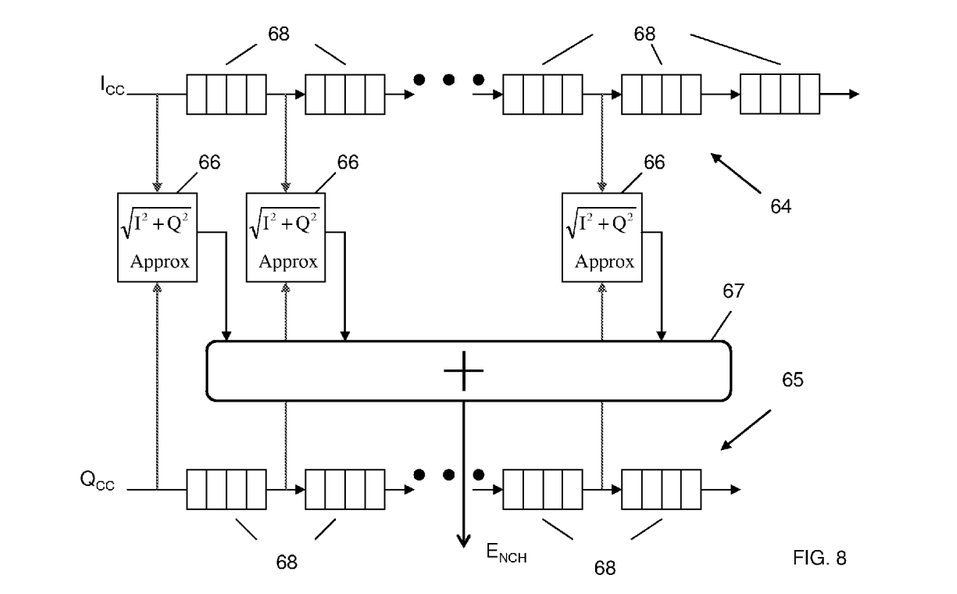
FIG. 8 is a diagram of the noncoherent peak magnitude processor in the system of FIG. 4.

Referring to FIG. 8, the noncoherent peak magnitude processor 36 includes an I-component branch 64, a Q-component branch 65, a plurality of magnitude approximation units 66 and a magnitude accumulator 67. The I-component branch 64 and the Q-component branch 65 each include a plurality of RAM buffers 68 arrayed in a FIFO sequence.

The cross-correlated I-component and Q-component samples $I_{CC}$ and $Q_{CC}$ from the cross-correlator 34 are passed through the respective arrays of RAM buffers 68 in the I-component branch 64 and the Q-component branch 65.

Each RAM buffer 68 includes a number of stages that is a multiple of the number of samples-per-symbol "sps", the number of code elements "e" per preamble block and the spread factor SF (sps·e·SF). The sample provided from the output of the last stage of each RAM buffer 68 is provided to one of the magnitude approximation units 66. The number of RAM buffers 68 in each branch 64, 65 is two less than the number of blocks in the preamble.

The magnitude approximation units 66 respectively process the undelayed cross-correlated I-component samples $I_{CC}$ and Q-component samples $Q_{CC}$ from the cross-correlator 34 to generate a magnitude output that is an approximation of $\sqrt{I_C^2+Q_C^2}$, to thereby detect noncoherent energy peaks within the first accumulation interval and determine the magnitude of the detected noncoherent energy peaks.

Over the first accumulation interval, the magnitudes of the detected noncoherent energy peaks are accumulated and calculated by the magnitude accumulator 67 to thereby provide the second metric $E_{NCH}$ that represents a noncoherent accumulation of energy over the first accumulation interval.

Referring again to FIG. 4, the maximum peak magnitude processor 38 processes the samples $I_{CC}$ and $Q_{CC}$ from the cross-correlator 34 with the predetermined pattern of the code elements of the predetermined preamble blocks to provide a third metric $E_{MPK}$ representing a coherent accumulation of energy over a second accumulation interval approximating the duration of the sequence of encoded preamble blocks, such as the number of blocks minus one. In the preferred embodiment in which the preamble 10 includes a sequence of twenty-eight preamble blocks 14, the duration of the second accumulation interval is the duration of twenty-seven blocks 14.

Figure 9:
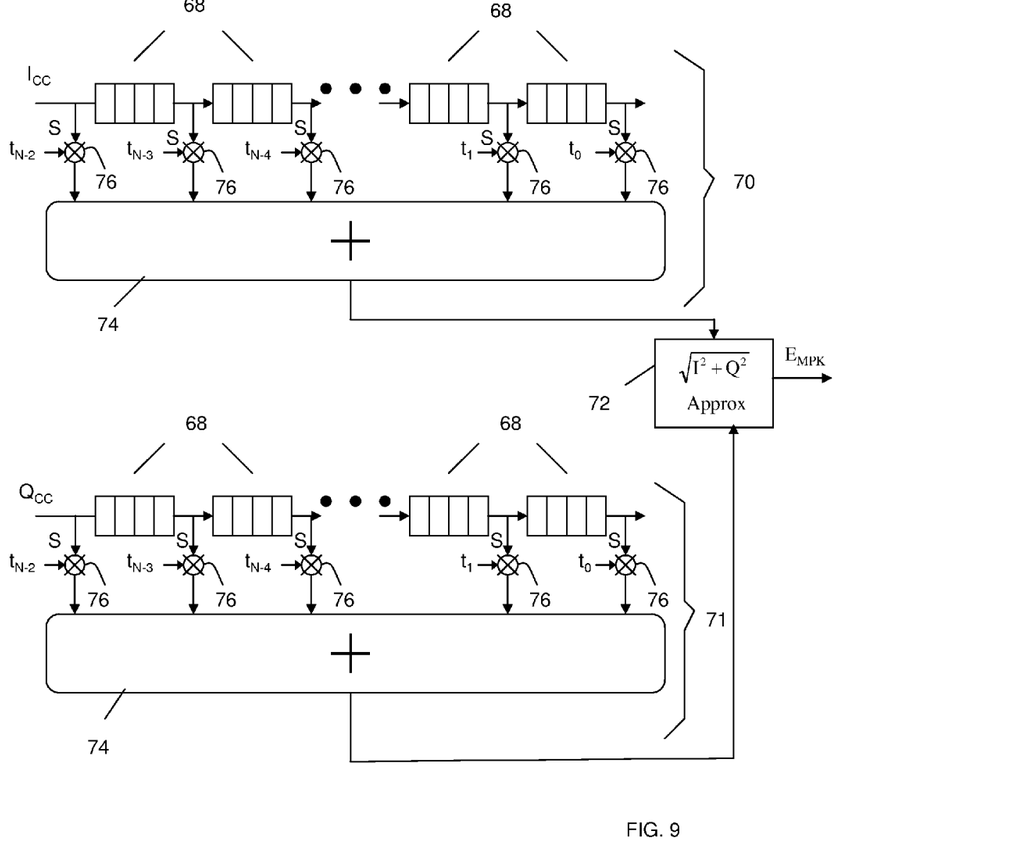
FIG. 9 is a diagram of the maximum peak magnitude processor in the system of FIG. 4.

Referring to FIG. 9, the maximum peak magnitude processor 38 includes an I-component branch 70, a Q-component branch 71 and a complex magnitude approximator 72. In the preferred embodiment, the I-component branch 70 and the Q-component branch 71 each include the same arrayed pluralities of RAM buffers 68 that are included in the I-component branch 64 and the Q-component branch 65 of the noncoherent peak magnitude processor 36, and a magnitude accumulator 74. The I-component branch 70 and the Q-component branch 71 also each includes a plurality of simplified multiplication elements 76. The simplified multiplication elements 76 are separate from but of the same configuration as the simplified multiplication elements 46 shown in FIG. 5A.

The sequence of code elements 43 that was used to encode the preamble blocks in order to provide the encoded preamble blocks in the signal that is being received is retrieved from the memory 30 and temporarily retained in a register (not shown) in the maximum peak magnitude processor 38.

The control inputs "t" of the simplified multiplication elements 76 are coupled respectively to different taps of the register of the processor 38 in which the retrieved sequence of code elements 43 is temporarily retained for processing with the correlated I-component and Q-component samples from the cross-correlator 34.

The number of register taps and the corresponding number of simplified multiplication elements 76 of the maximum peak magnitude processor 38 that are utilized for processing the correlated I-component samples and Q-component samples from the cross-correlator 34 is selected in accordance with the spread factor SF.

The correlated I-component and Q-component samples from the cross-correlator 34 are passed through the respective arrays of RAM buffers 68 in the I-component branch 70 and the Q-component branch 71. These correlated samples are provided from the RAM buffers 68 to s-input the simplified multiplication elements 76 in the maximum peak magnitude processor 38 just after these same correlated samples are provided from the RAM buffers 68 to the magnitude approximation units in the noncoherent peak magnitude processor 36.

The simplified multiplication elements 76 respectively process the undelayed cross-correlated I-component samples $I_{CC}$ and Q-component samples $I_{QC}$ from the cross-correlator 34 and the delayed samples provided from the respective RAM buffers 68 of both the I-component branch 70 and the Q-component branch 71 with the retrieved sequence of code elements 43 that are provided to the control inputs "t" of the simplified multiplication elements 76 from the respective taps of the register in the maximum peak magnitude processor 38 to detect maximum energy peaks during the second accumulation intervals in which the correlated samples are coherent with the predetermined pattern of the preamble block code elements.

During the second accumulation interval, the magnitudes of the detected maximum energy peaks are accumulated and calculated by the magnitude accumulators 74 in the respective I-component branch 70 and the Q-component branch 71. The magnitudes of the detected maximum energy peaks that are accumulated and calculated by the magnitude accumulators 74 are processed by the complex magnitude approximator 72 to generate a magnitude output that is an approximation of $\sqrt{I_C^2+Q_C^2}$, and thereby provide the third metric $E_{MPK}$ that represents the coherent accumulation of energy over a second accumulation interval.

Referring again to FIG. 4, the detector 40 processes the second metric $E_{NCH}$ provided by the noncoherent peak magnitude processor 36 with the first metric $E_{AVE}$ provided by the moving average generator 28 and the third metric $E_{MPK}$ provided by the maximum peak magnitude processor 38 to detect the preamble in the received signal.

The detector 40 detects the predetermined preamble in the received signal when is the second metric $E_{NCH}$ representing the noncoherent accumulation of energy is greater than a predetermined coefficient alpha times the first metric $E_{AVE}$ representing the average energy of the received signal and the third metric $E_{MPK}$ representing the coherent accumulation of energy is greater than a predetermined coefficient beta times the second metric $E_{NCH}$.

Before further describing the operation of the detector 40, as a background for such operation it is helpful to view time-domain waveforms of the signals provided at the outputs of certain components of the system of FIG. 4 and sample-domain graphs of the detector metrics processed by the detector 40.

Figure 10A:
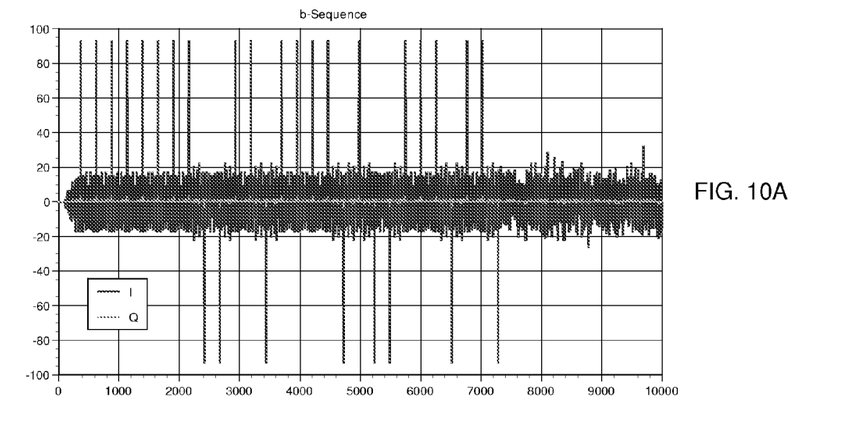
FIG. 10A is a time-domain waveform of a correlated signal provided from the output of the correlator in the system of FIG. 4.
Figure 10B:
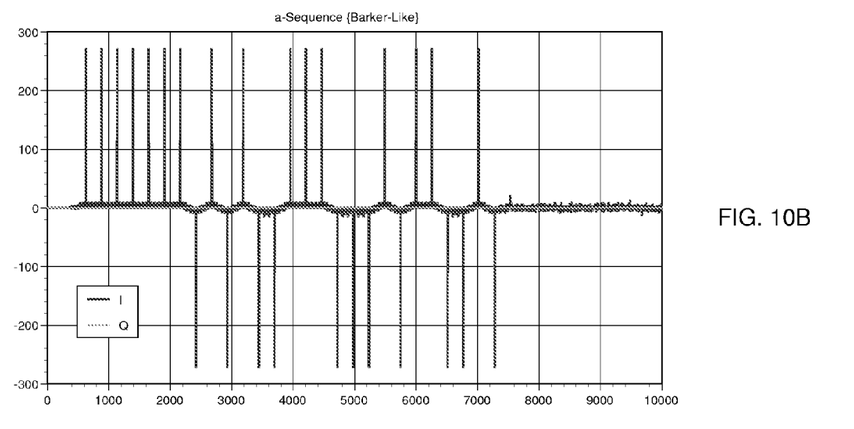
FIG. 10B is a time-domain waveform of a correlated signal provided from the output of the cross-correlator in the system of FIG. 4.
Figure 10C:
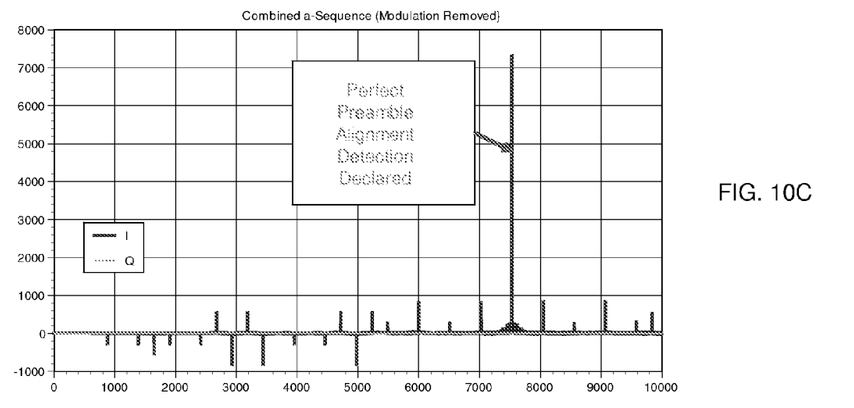
FIG. 10C is a time-domain waveform of the signal provided from the output of the maximum peak magnitude processor in the system of FIG. 4.

The waveform of the correlated sample signal provided from the output of the correlator 32 is shown in FIG. 10A. The waveform of the correlated sample signal provided from the output of the cross-correlator 34 is shown in FIG. 10B. The waveform of the third metric signal $E_{MPK}$ provided from the output of the maximum peak magnitude processor 38 is shown in FIG. 10C. These waveforms are phase aligned along the I-axis for clarity. These waveforms were produced by processing samples of a received BPSK signal having 128 symbols per encoded preamble block (eight code-element symbols per unspread block times a spread factor of 16), with the received signal having been sampled at the rate of two samples per symbol to provide 256 samples during the duration of an encoded preamble block in the received signal.

Referring to FIG. 10A, the timing aspect of the predetermined pattern of code elements 42 of the preamble blocks that were encoded to provide the sequence of encoded preamble blocks in the received signal can be seen in a correlated sample signal that was provided from the output of the correlator 32 when the correlated samples were aligned with the sequence of encoded preamble blocks.

Referring to FIG. 10B, the timing aspect of the predetermined pattern of code elements 42 of the identical preamble blocks that were encoded to provide the sequence of encoded preamble blocks in the received signal can be seen more clearly in a correlated sample signal that was provided from the output of the cross-correlator 34 after the correlated samples had been processed to compensate for any frequency error in the correlated samples with respect to the received signal.

Referring to FIG. 10C, the predetermined pattern of code elements 42 of the identical preamble blocks that were encoded to provide the sequence of encoded preamble blocks in the received signal can be seen in a third metric signal $E_{MPK}$ that was provided from the output of the maximum peak magnitude processor 38 when the correlated samples from the cross-correlator 34 were coherently correlated with the preamble encoding sequence 43 that was used to encode the preamble blocks of the received signal.

Figure 11:
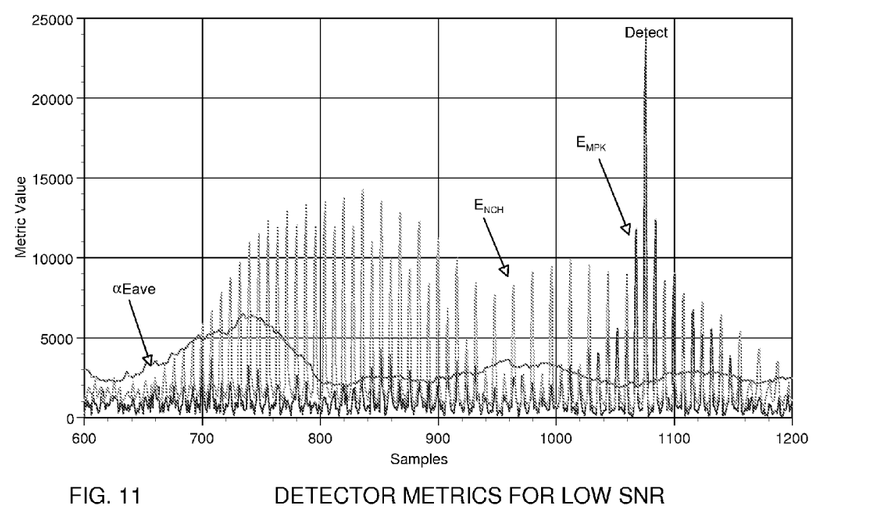
FIG. 11 is a sample-domain graph showing detector metrics during receipt of low signal-to-noise-ratio signals.
Figure 12:
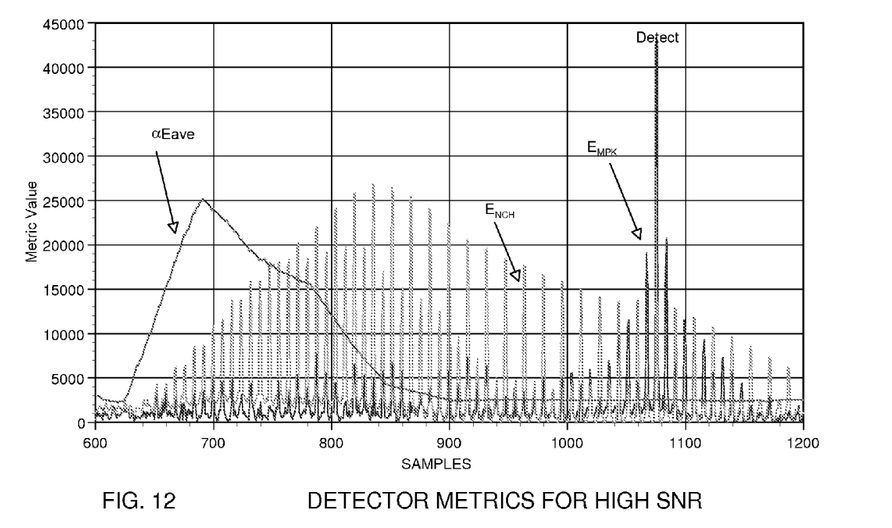
FIG. 12 is a sample-domain graph showing detector metrics during receipt of high signal-to-noise-ratio signals.

The three metrics $E_{AVE}$, $E_{NCH}$, $E_{MPK}$ that are processed by the detector 40 in order to detect the predetermined preamble are shown graphically in FIGS. 11 and 12. Note that the value of $E_{AVE}$ shown in these two graphs is alpha $E_{AVE}$. FIG. 11 shows these three detector metrics during receipt of low signal-to-noise-ratio signals; and FIG. 12 shows these three detector metrics during receipt of high signal-to-noise-ratio signals. It is noted that alpha $E_{AVE}$ is erroneously high while the AGC loop for the received signal is settling and does not settle to a relatively stable value during receipt of high signal-to-noise-ratio signals until significantly later than during receipt of low signal-to-noise-ratio signals.

The graphs of FIGS. 11 and 12 were produced by processing the samples of a received narrow band BPSK signal having eight samples per encoded preamble block and a spread factor of 1, with the received signal having been sampled at the rate of two samples per symbol to thereby provide 16 samples during the duration of an encoded preamble block in the received signal. The first metric $E_{AVE}$ was generated by the moving average generator 28 over progressive evaluation intervals of sixty-four samples.

It may be seen in FIGS. 11 and 12 that there are periodic peaks in the second metric $E_{NCHK}$ which peaks are separated by an interval having a duration corresponding to the duration of an encoded preamble block and that there are at least twelve peak values of the second metric $E_{NCHK}$ that are greater than alpha $E_{AVE}$ prior to the detection of the peak value of the second metric $E_{NCHK}$. It may also be seen that the peak values of the second metric $E_{NCHK}$ quickly diminish toward the value of alpha $E_{AVE}$ after the peak value of the second metric $E_{NCHK}$ has been detected.

Figure 13:
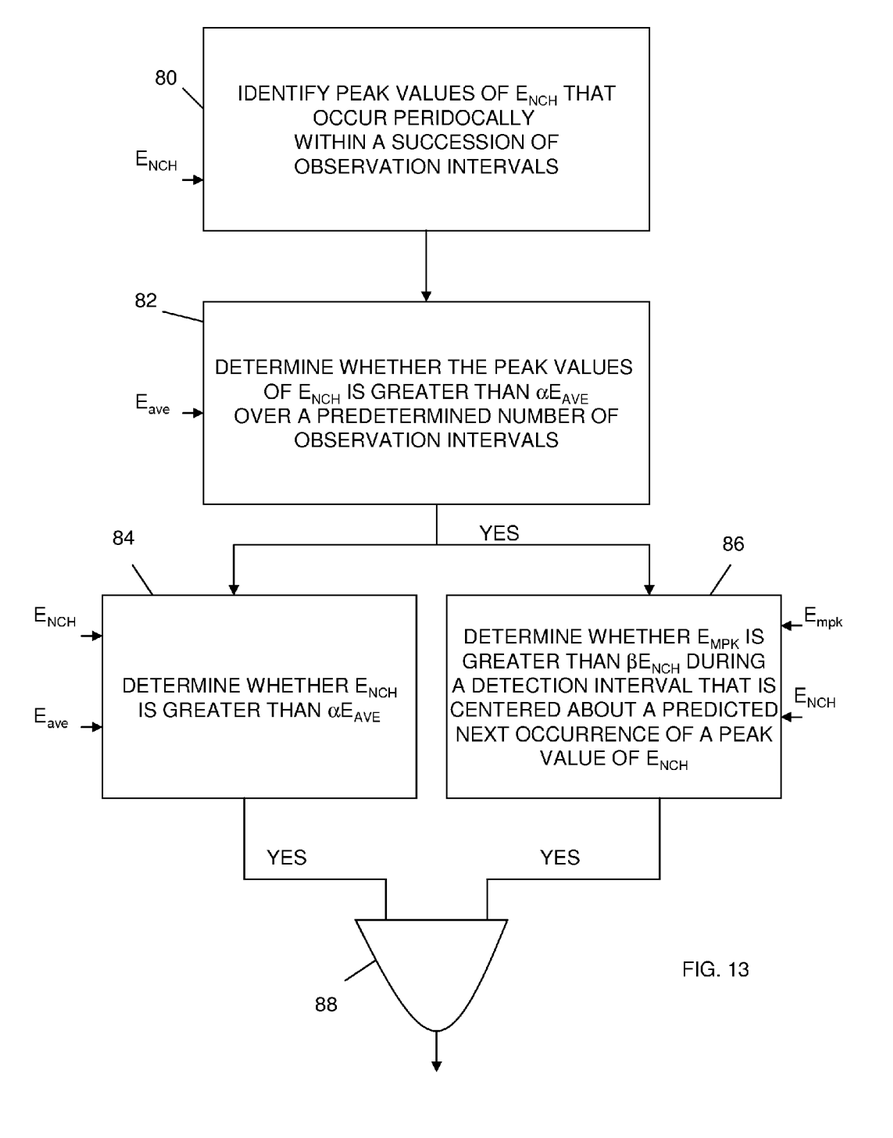
FIG. 13 is a flow diagram showing some of the functions of the detector in the system of FIG. 4.

Referring to FIG. 13, the detector 40 performs a step 80 of processing the second metric $E_{NCH}$ to identify peak values of the second metric $E_{NCH}$ that occur periodically within a succession of observation intervals and a step 82 of determining whether the peak value of the second metric $E_{NCH}$ is greater than a predetermined coefficient gamma times the first metric $\gamma E_{AVE}$ during a predetermined number of the periodic observation intervals. An observation interval has a duration corresponding to the duration of the preamble block. The predetermined number of periodic observation intervals in which the peak value of $E_{NCH}$ is greater than $\gamma E_{AVE}$ do not have to be consecutive, provided that they occur within the same succession of periodic observation intervals. In a preferred embodiment, the predetermined number is ten.

Upon determining pursuant to step 82 that the peak value of the second metric $E_{NCH}$ exceeds the predetermined coefficient gamma times the first metric $\gamma E_{AVE}$ during the predetermined number of observation intervals, the detector 40 is enabled to perform a step 84 of determining whether the second metric $E_{NCH}$ is greater than a predetermined coefficient alpha times the first metric $\alpha E_{AVE}$ and to perform a step 86 of determining whether the third metric $E_{MPK}$ is greater than the predetermined coefficient beta times the second metric $\beta E_{NCH}$ during a detection interval that is centered about a predicted next occurrence of a peak value of the second metric $E_{NCH}$. The next occurrence of a peak value of the second metric is predicted in accordance with the periodicity of the peak values of the second metric $E_{NCH}$.

As represented by the AND symbol 88, the detector 40 detects the preamble in the received signal when the detector 40 determines pursuant to step 84 that the second metric $E_{NCH}$ is greater than a predetermined coefficient $\alpha$ times the first metric $\alpha E_{AVE}$ and the detector 40 also determines pursuant to step 86 that the third metric $E_{MPK}$ is greater than the predetermined coefficient $\beta$ times the second metric $\beta E_{NCH}$ during the detection interval.

The three predetermined coefficients alpha ($\alpha$), beta ($\beta$), and gamma ($\gamma$) are selected to optimize the detection and to prevent false detections. Alpha will always be a number less than unity, beta will likely be between 1.0 and 2.0, and gamma will be between 1.0 and 2.0.

The above-described system of FIG. 4 for detecting the predetermined preamble in a received signal is used for detecting the predetermined preamble in both signals that are transmitted as DSSS signals and signals that are transmitted as narrow band signals, provided that the preambles for both types of signals are prepared for transmission in accordance with the method of the present invention to have preambles that are compatible for detection of the predetermined preamble. The parameters of the components of the system of FIG. 4 are adjusted in accordance with the spread factor, which typically is one for narrow band signals.

The signal processing components of the system of the present invention are embodied in one or more microcomputers, which are programmed by computer readable storage media. The computer readable storage media contain instructions for accomplishing the various signal processing steps described herein. As used in the claims, the term computer readable storage medium is not limited to one computer readable medium, but may also be interpreted to mean a plurality of computer readable storage media.

The benefits specifically stated herein do not necessarily apply to every conceivable embodiment of the present invention. Further, such stated benefits of the present invention are only examples and should not be construed as the only benefits of the present invention.

While the above description contains many specificities, these specificities are not to be construed as limitations on the scope of the present invention, but rather as examples of the preferred embodiments described herein. Other variations are possible and the scope of the present invention should be determined not by the embodiments described herein but rather by the claims and their legal equivalents. The claims require no implicit limitations. Each claim is to be construed explicitly as stated, or by its legal equivalent.

Regarding the method claims, except for those steps that can only occur in the sequence in which they are recited, and except for those steps for which the occurrence of a given sequence is specifically recited or must be inferred, the steps of the method claims do not have to occur in the sequence in which they are recited.

The invention claimed is:

1. A method of processing preambles of signals that are to be transmitted as direct sequence spread spectrum (DSSS) signals and narrowband signals to prepare the preambles for transmission, comprising the steps of:
   (a) when the signal is to be transmitted as a narrow band signal, providing an unspread preamble that includes a sequence of blocks, with each of the blocks having the same number of code elements in the same predetermined pattern;
   (b) when the signal is to be transmitted as a DSSS signal, providing a spread preamble that includes a sequence of the same number of blocks as the number of blocks in the unspread preamble, with each of the blocks of the spread preamble having a number of code elements corresponding to a spread-factor multiple of the number of code elements in each of the blocks of the unspread preamble, with each of the blocks of the spread preamble having the same predetermined pattern of code elements; wherein the spread factor is an integer greater than one;
   (c) providing a preamble encoding sequence that includes the same given number of code elements as the number of blocks of the preamble; and
   (d) using encoding means to encode the sequence of preamble blocks with sequentially corresponding code elements of the preamble encoding sequence to thereby provide a sequence of encoded preamble blocks.

2. A method according to claim 1, further comprising the step of:
   (e) including a plurality of sacrificial segments in the preamble prior to the sequence of encoded preamble blocks, each of which sacrificial segments includes the same number of code elements as in an individual block of the preamble, with the code elements of the sacrificial segments having a pattern that is uncorrelated to the predetermined pattern of code elements in the individual preamble block.

3. A method of detecting a preamble in a received signal, wherein the received signal includes a sequence of encoded preamble blocks, each of which blocks has the same number of code elements, wherein the sequence of encoded preamble blocks has been provided by encoding a sequence of identical preamble blocks with sequentially corresponding code elements of a preamble encoding sequence, and wherein each of the identical preamble blocks has the same predetermined pattern of code elements, the method comprising the steps of:
   (a) using sampling means to periodically sample a received signal having said sequence of encoded preamble blocks to provide of a sequence of received signal samples;
   (b) processing the received signal samples to provide a first metric representing an average energy of the received signal;
   (c) processing the received signal samples with the predetermined pattern of code elements of the identical preamble blocks that were encoded to provide the sequence of encoded preamble blocks, to thereby provide samples of the received signal that are correlated with the predetermined pattern of code elements;
   (d) processing the correlated samples to provide a second metric representing a noncoherent accumulation of energy over a first accumulation interval having a duration corresponding to the duration of a plurality of said encoded preamble blocks;
   (e) processing the correlated samples with the preamble encoding sequence, to thereby provide a third metric representing a coherent accumulation of energy over a second accumulation interval approximating the duration of the sequence of encoded preamble blocks; and
   (f) processing the second metric with the first metric and the third metric to detect a preamble in the received signal.

4. A method according to claim 3, wherein step (d) comprises the step of:
   (g) processing the correlated samples to detect noncoherent energy peaks within the first accumulation interval;
   (h) during the first accumulation interval determining the approximate magnitudes of the detected noncoherent energy peaks; and
   (i) over the first accumulation interval calculating an accumulation of the approximate magnitudes of the detected noncoherent energy peaks to thereby provide the second metric;
   wherein step (e) comprises the steps of:
   (j) processing the correlated samples with the preamble encoding sequence to detect maximum energy peaks during the second accumulation interval intervals in which the correlated samples are coherent with the preamble in the received signal;

(k) during the second accumulation interval determining the approximate magnitudes of the detected maximum energy peaks; and (l) over the second accumulation interval calculating an accumulation of the magnitudes of the detected maximum energy peaks to thereby provide the third metric; and wherein step (f) comprises the step of:

(m) detecting the preamble in the received signal when the second metric representing the noncoherent accumulation of energy is greater than a predetermined coefficient alpha times the first metric representing the average energy of the received signal and the third metric representing the coherent accumulation of energy is greater than a predetermined coefficient alpha times the second metric.

5. A method according to claim 4, wherein step (f) further comprises the steps of:

(n) processing the second metric to identify peak values of the second metric that occur periodically within a succession of observation intervals, wherein an observation interval has a duration corresponding to the duration of a said encoded preamble block;

(o) determining whether the peak value of the second metric is greater than a predetermined coefficient gamma times the first metric during a predetermined number of observation intervals within the periodic succession of observation intervals; and (p) performing step (m) upon it being determined pursuant to step (o) that the peak value of the second metric is greater than the predetermined coefficient gamma times the first metric during the predetermined number of observation intervals within the periodic succession of observation intervals.

6. A method according to claim 3, wherein step (f) comprises the steps of:

(g) determining whether periodically occurring peak values of the second metric are greater than a predetermined coefficient gamma times the fast metric during a predetermined number of observation intervals within a periodic succession of observation intervals, wherein an observation interval has a duration corresponding to the duration of a said encoded preamble block; and (h) upon determining pursuant to step (g) that the peak value of the second metric is greater than the predetermined coefficient gamma times the first metric during the predetermined number of observation intervals within the periodic succession of observation intervals, determining whether the second metric is greater than a predetermined coefficient alpha times the first metric and whether the third metric is greater than the predetermined coefficient alpha times the second metric during a detection interval that is centered about a predicted next occurrence of a peak value of the second metric to thereby detect the preamble in the received signal, with the next occurrence of a peak value of the second metric being predicted in accordance with the periodicity of the peak values of the second metric.

7. A method according to claim 3, further comprising the step of:

(g) after step (c) and prior to steps (d) and (e), cross-correlating delayed and undelayed in-phase and quadrature-phase components to compensate for any frequency error in the correlated samples with respect to the received signal.

8. A method according to claim 3 for detecting preambles in received signals, wherein the received signals include narrow band signals and direct sequence spread spectrum (DSSS) signals;

wherein when the received signal is a narrow band signal, the preamble that includes the sequence of preamble blocks that has been encoded is an unspread preamble; and wherein when the received signal is a DSSS band signal, the preamble that includes the sequence of preamble blocks that has been encoded is a spread preamble in which each of the blocks has a number of code elements corresponding to a spread-factor multiple of the number of code elements in a said block of the unspread preamble, wherein the spread factor is an integer greater than one.

9. A system for processing preambles of signals that are to be transmitted as direct sequence spread spectrum (DSSS) signals and narrowband signals to prepare the preambles for transmission, comprising:

means for providing an unspread preamble when the signal is to be transmitted as a narrow band signal, wherein the unspread preamble includes a sequence of blocks, with each of the blocks having the same number of code elements in the same predetermined pattern;

means for providing a spread preamble when the signal is to be transmitted as a DSSS signal, wherein the spread preamble includes a sequence of the same number of blocks as the number of blocks in the unspread preamble, with each of the blocks of the spread preamble having a number of code elements corresponding to a spread-factor multiple of the number of code elements in each of the blocks of the unspread preamble, with each of the blocks of the spread preamble having the same predetermined pattern of code elements; wherein the spread factor is an integer greater than one;

means for providing a preamble encoding sequence that includes the same given number of code elements as the number of blocks of the preamble; and means for encoding the sequence of preamble blocks with sequentially corresponding code elements of the preamble encoding sequence to thereby provide a sequence of encoded preamble blocks.

10. A system according to claim 9, further comprising the step of:

means for including a plurality of sacrificial segments in the preamble prior to the sequence of encoded preamble blocks, each of which sacrificial segments includes the same number of code elements as in an individual block of the preamble, with the code elements of the sacrificial segments having a pattern that is uncorrelated to the predetermined pattern of code elements in the individual preamble block.

11. A system for detecting a preamble in a received signal, wherein the received signal includes a sequence of encoded preamble blocks, each of which blocks has the same number of code elements, wherein the sequence of encoded preamble blocks has been provided by encoding a sequence of identical preamble blocks with sequentially corresponding code elements of a preamble encoding sequence, and wherein each of the identical preamble blocks has the same predetermined pattern of code elements, the system comprising:

means for periodically sampling a received signal having said sequence of encoded preamble blocks to provide of a sequence of received signal samples;

means for processing the received signal samples to provide a first metric representing an average energy of the received signal;

means for processing the received signal samples with the predetermined pattern of code elements of the identical preamble blocks that were encoded to provide the sequence of encoded preamble blocks, to thereby provide samples of the received signal that are correlated with the predetermined pattern of code elements;

means for processing the correlated samples to provide a second metric representing a noncoherent accumulation of energy over a first accumulation interval having a duration corresponding to the duration of a plurality of said encoded preamble blocks;

means for processing the correlated samples with the preamble encoding sequence, to thereby provide a third metric representing a coherent accumulation of energy over a second accumulation interval approximating the duration of the sequence of encoded preamble blocks; and means for processing the second metric with the first metric and the third metric to detect a preamble in the received signal.

12. A system according to claim 11, wherein the means for processing the correlated samples to provide the second metric comprise:

means for processing the correlated samples to detect noncoherent energy peaks within the first accumulation interval;

means for determining the approximate magnitudes of the detected noncoherent energy peaks during the first accumulation interval; and means for calculating an accumulation of the approximate magnitudes of the detected noncoherent energy peaks over the first accumulation interval to thereby provide the second metric;

wherein the means for processing the correlated samples to provide the third metric comprise:

means for processing the correlated samples with the preamble encoding sequence to detect maximum energy peaks during the second accumulation interval intervals in which the correlated samples are coherent with the preamble in the received signal;

means for determining the approximate magnitudes of the detected maximum energy peaks during the second accumulation interval; and means for over the second accumulation interval calculating an accumulation of the magnitudes of the detected maximum energy peaks to thereby provide the third metric; and wherein the means for processing the second metric with the first metric and the third metric to detect the preamble comprise:

means for detecting the preamble in the received signal when the second metric representing the noncoherent accumulation of energy is greater than a predetermined coefficient alpha times the first metric representing the average energy of the received signal and the third metric representing the coherent accumulation of energy is greater than a predetermined coefficient alpha times the second metric.

13. A system according to claim 12, wherein the means for processing the second metric with the first metric and the third metric to detect the preamble further comprise:

means for processing the second metric to identify peak values of the second metric that occur periodically within a succession of observation intervals, wherein an observation interval has a duration corresponding to the duration of a said encoded preamble block;

means for determining whether the peak value of the second metric is greater than a predetermined coefficient gamma times the first metric during a predetermined number of observation intervals within the periodic succession of observation intervals; and wherein the means for detecting the preamble are enabled upon it being determined that the peak value of the second metric is greater than the predetermined coefficient gamma times the first metric during the predetermined number of observation intervals within the periodic succession of observation intervals.

14. A system according to claim 11, means for detecting the preamble in the received signal comprise:

means for determining whether periodically occurring peak values of the second metric are greater than a predetermined coefficient gamma times the first metric during a predetermined number of observation intervals within a periodic succession of observation intervals, wherein an observation interval has a duration corresponding to the duration of a said encoded preamble block; and means for determining whether the second metric is greater than a predetermined coefficient alpha times the first metric and whether the third metric is greater than the predetermined coefficient alpha times the second metric during a detection interval that is centered about a predicted next occurrence of a peak value of the second metric to thereby detect the preamble in the received signal, with the next occurrence of a peak value of the second metric being predicted in accordance with the periodicity of the peak values of the second metric, wherein said last recited means are enabled when it is determined that the peak value of the second metric is greater than the predetermined coefficient gamma times the first metric during the predetermined number of observation intervals within the periodic succession of observation intervals.

15. A system according to claim 11, further comprising:

means for cross-correlating delayed and undelayed in-phase and quadrature-phase components to compensate for any frequency error in the correlated samples with respect to the received signal.

16. A computer readable medium for use with a computer in a system for detecting a preamble in a received signal, wherein the received signal includes a sequence of encoded preamble blocks, each of which blocks has the same number of code elements, wherein the sequence of encoded preamble blocks has been provided by encoding a sequence of identical preamble blocks with sequentially corresponding code elements of a preamble encoding sequence, and wherein each of the identical preamble blocks has the same predetermined pattern of code elements, wherein the computer readable medium contains program instructions for:

(a) periodically sampling a received signal having said sequence of encoded preamble blocks to provide of a sequence of received signal samples;

(b) processing the received signal samples to provide a first metric representing an average energy of the received signal;

(c) processing the received signal samples with the predetermined pattern of code elements of the identical preamble blocks that were encoded to provide the sequence of encoded preamble blocks, to thereby provide samples of the received signal that are correlated with the predetermined pattern of code elements;

(d) processing the correlated samples to provide a second metric representing a noncoherent accumulation of energy over a first accumulation interval having a duration corresponding to the duration of a plurality of said encoded preamble blocks;

(e) processing the correlated samples with the preamble encoding sequence, to thereby provide a third metric representing a coherent accumulation of energy over a second accumulation interval approximating the duration of the sequence of encoded preamble blocks; and (f) processing the second metric with the first metric and the third metric to detect a preamble in the received signal.

17. A computer readable medium according to claim 16, wherein step (d) comprises the step of:

(g) processing the correlated samples to detect noncoherent energy peaks within the first accumulation interval;

(h) during the first accumulation interval determining the approximate magnitudes of the detected noncoherent energy peaks; and (i) over the first accumulation interval calculating an accumulation of the approximate magnitudes of the detected noncoherent energy peaks to thereby provide the second metric;

wherein step (e) comprises the steps of:

(j) processing the correlated samples with the preamble encoding sequence to detect maximum energy peaks during the second accumulation interval intervals in which the correlated samples are coherent with the preamble in the received signal;

(k) during the second accumulation interval determining the approximate magnitudes of the detected maximum energy peaks; and (l) over the second accumulation interval calculating an accumulation of the magnitudes of the detected maximum energy peaks to thereby provide the third metric; and wherein step (f) comprises the step of:

(m) detecting the preamble in the received signal when the second metric representing the noncoherent accumulation of energy is greater than a predetermined coefficient alpha times the first metric representing the average energy of the received signal and the third metric representing the coherent accumulation of energy is greater than a predetermined coefficient alpha times the second metric.

18. A computer readable medium according to claim 17, wherein step (f) further comprises the steps of:

(n) processing the second metric to identify peak values of the second metric that occur periodically within a succession of observation intervals, wherein an observation interval has a duration corresponding to the duration of a said encoded preamble block;

(o) determining whether the peak value of the second metric is greater than a predetermined coefficient gamma times the first metric during a predetermined number of observation intervals within the periodic succession of observation intervals; and (p) performing step (m) upon it being determined pursuant to step (o) that the peak value of the second metric is greater than the predetermined coefficient gamma times the first metric during the predetermined number of observation intervals within the periodic succession of observation intervals.

19. A computer readable medium according to claim 16, wherein step (f) comprises the steps of:

(g) determining whether periodically occurring peak values of the second metric are greater than a predetermined coefficient gamma times the first metric during a predetermined number of observation intervals within a periodic succession of observation intervals, wherein an observation interval has a duration corresponding to the duration of a said encoded preamble block; and (h) upon determining pursuant to step (g) that the peak value of the second metric is greater than the predetermined coefficient gamma times the first metric during the predetermined number of observation intervals within the periodic succession of observation intervals, determining whether the second metric is greater than a predetermined coefficient alpha times the first metric and whether the third metric is greater than the predetermined coefficient alpha times the second metric during a detection interval that is centered about a predicted next occurrence of a peak value of the second metric to thereby detect the preamble in the received signal, with the next occurrence of a peak value of the second metric being predicted in accordance with the periodicity of the peak values of the second metric.

20. A computer readable medium according to claim 16, further comprising the step of:

(g) after step (c) and prior to steps (d) and (e), cross-correlating delayed and undelayed in-phase and quadrature-phase components to compensate for any frequency error in the correlated samples with respect to the received signal.

* * * * *

UNITED STATES PATENT AND TRADEMARK OFFICE
CERTIFICATE OF CORRECTION

PATENT NO. : 7,643,535 B1
APPLICATION NO. : 11/460337
DATED : January 5, 2010
INVENTOR(S) : Wiss et al.

It is certified that error appears in the above-identified patent and that said Letters Patent is hereby corrected as shown below:

at column 5, line 21, "M" should be --$M^2$--.

at column 9, line 11, "is" should be omitted.

Signed and Sealed this

Thirteenth Day of April, 2010

David J. Kappos
*Director of the United States Patent and Trademark Office*

UNITED STATES PATENT AND TRADEMARK OFFICE
CERTIFICATE OF CORRECTION

PATENT NO.       : 7,643,535 B1                                    Page 1 of 1
APPLICATION NO.  : 11/460337
DATED            : January 5, 2010
INVENTOR(S)      : Wiss et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 784 days.

Signed and Sealed this

Sixteenth Day of November, 2010

David J. Kappos
*Director of the United States Patent and Trademark Office*